United States Patent
Dhouib et al.

(10) Patent No.: US 12,326,959 B2
(45) Date of Patent: Jun. 10, 2025

(54) SYSTEM AND METHOD FOR IMPROVED WATERMARKING AND DATA TRACING

(71) Applicant: Accenture Global Solutions Limited, Dublin (IE)

(72) Inventors: Baya Dhouib, Valbonne (FR); Laetitia Kameni, Juan-les-Pins (FR); Richard Vidal, Antibes (FR)

(73) Assignee: Accenture Global Solutions Limited, Dublin (IE)

( * ) Notice: Subject to any disclaimer, the term of this patent is extended or adjusted under 35 U.S.C. 154(b) by 219 days.

(21) Appl. No.: 18/095,278

(22) Filed: Jan. 10, 2023

(65) Prior Publication Data

US 2024/0078335 A1 Mar. 7, 2024

(30) Foreign Application Priority Data

Sep. 2, 2022 (EP) .................................... 22290050

(51) Int. Cl.
  *G06F 21/62* (2013.01)
  *G06F 21/60* (2013.01)

(52) U.S. Cl.
  CPC ........ *G06F 21/6245* (2013.01); *G06F 21/602* (2013.01); *G06F 2221/2107* (2013.01); *G06F 2221/2135* (2013.01)

(58) Field of Classification Search
  None
  See application file for complete search history.

(56) References Cited

U.S. PATENT DOCUMENTS

| | | | |
|---|---|---|---|
| 7,757,101 B2 * | 7/2010 | Nonaka .................. | H04H 60/23 713/168 |
| 8,180,740 B1 * | 5/2012 | Stager ................. | G06F 16/1752 707/660 |

(Continued)

FOREIGN PATENT DOCUMENTS

CN 109872267 A 6/2019

OTHER PUBLICATIONS

Shen, X. et al. "Relational Database Watermarking for Data Tracing," IEEE 2020 International Conference on Cyber-Enabled Distributed Computing and Knowledge Discovery, Chongqing, China, Oct. 29-30, 2020, pp. 224-231, 8 pages.

(Continued)

*Primary Examiner* — Kambiz Zand
*Assistant Examiner* — Mahabub S Ahmed

(57) ABSTRACT

Aspects of the present disclosure provide systems, methods, apparatus, and computer-readable storage media that support improved watermarking and fingerprinting of a shared dataset. To illustrate, clustering may be performed on the dataset using initial clustering parameters (e.g., a secret key) to assign each record (e.g., attribute) of the dataset to one of multiple clusters. The secret key may be selected by a user or determined automatically based on the clustering algorithm. After the clustering, the records of each cluster may be selected for embedding a portion of fingerprint data based on one or more security parameters (e.g., a hash function, priority values, even/or selection, etc.). The selected records (or portions thereof) may be replaced with corresponding portions of the fingerprint data to embed the fingerprint data within different records as watermarking. Aspects also include analyzing a dataset to verify whether watermarking is present and to extract a fingerprint.

20 Claims, 5 Drawing Sheets

(56) References Cited

U.S. PATENT DOCUMENTS

| | | | | |
|---|---|---|---|---|
| 10,410,000 | B1* | 9/2019 | Ghafourifar | G06F 21/602 |
| 11,568,028 | B2* | 1/2023 | Coleman | H04L 9/0643 |
| 2001/0051996 | A1* | 12/2001 | Cooper | H04L 63/101 |
| | | | | 705/26.1 |
| 2002/0010679 | A1* | 1/2002 | Felsher | G06F 21/6245 |
| | | | | 705/51 |
| 2002/0178410 | A1* | 11/2002 | Haitsma | H04H 60/37 |
| | | | | 714/709 |
| 2003/0123659 | A1* | 7/2003 | Forstrom | H04N 1/32277 |
| | | | | 713/180 |
| 2004/0174996 | A1* | 9/2004 | Tewfik | H04N 21/23892 |
| | | | | 380/278 |
| 2005/0063027 | A1* | 3/2005 | Durst, Jr. | G07D 7/0032 |
| | | | | 359/558 |
| 2005/0259844 | A1* | 11/2005 | Kot | G06T 1/0028 |
| | | | | 382/100 |
| 2006/0161777 | A1* | 7/2006 | Kalker | G10L 19/018 |
| | | | | 704/E19.009 |
| 2007/0180537 | A1* | 8/2007 | He | G06T 1/005 |
| | | | | 726/32 |
| 2007/0266393 | A1* | 11/2007 | Surlaker | G06F 9/544 |
| | | | | 719/314 |
| 2009/0276619 | A1* | 11/2009 | Collens | G06T 1/005 |
| | | | | 713/153 |
| 2012/0308071 | A1* | 12/2012 | Ramsdell | H04N 1/32144 |
| | | | | 382/100 |
| 2015/0006895 | A1* | 1/2015 | Irvine | G06F 21/6209 |
| | | | | 713/171 |
| 2015/0286843 | A1* | 10/2015 | Brant | H04L 63/0823 |
| | | | | 713/176 |
| 2016/0034452 | A1* | 2/2016 | Ramanathan | G06F 16/48 |
| | | | | 707/747 |
| 2016/0105428 | A1* | 4/2016 | Schrempp | H04L 65/611 |
| | | | | 726/7 |
| 2016/0180097 | A1* | 6/2016 | Estehghari | H04L 9/0866 |
| | | | | 713/189 |
| 2018/0232488 | A1* | 8/2018 | Jafer | G06F 21/6254 |
| 2018/0253567 | A1* | 9/2018 | Gonzalez-Banos | |
| | | | | H04N 21/8358 |
| 2019/0132652 | A1* | 5/2019 | Zhao | H04N 21/8456 |
| 2019/0391972 | A1* | 12/2019 | Bates | G06F 3/04817 |
| 2020/0228347 | A1* | 7/2020 | Liu | G06F 21/6245 |
| 2020/0250338 | A1* | 8/2020 | McFall | G06F 21/16 |
| 2020/0274711 | A1* | 8/2020 | O'Hare | H04L 9/321 |
| 2020/0287898 | A1* | 9/2020 | Weaver | H04L 9/3231 |
| 2020/0329129 | A1* | 10/2020 | Li | H04L 45/64 |
| 2020/0387591 | A1* | 12/2020 | Witchey | G06F 21/32 |
| 2021/0124919 | A1* | 4/2021 | Balakrishnan | B42D 25/309 |
| 2021/0326463 | A1* | 10/2021 | Nilsson | G06F 21/62 |
| 2022/0043890 | A1* | 2/2022 | Choi | G06T 1/005 |
| 2022/0164419 | A1* | 5/2022 | Coleman | G06F 21/16 |
| 2023/0041340 | A1* | 2/2023 | Kitagawa | H04L 9/0662 |
| 2023/0315882 | A1* | 10/2023 | Livshits | G06T 1/0028 |
| | | | | 726/28 |
| 2023/0376577 | A1* | 11/2023 | Flöther | G06F 21/16 |
| 2024/0073743 | A1* | 2/2024 | Beveridge | H04L 45/64 |

OTHER PUBLICATIONS

Chai, H. et al. "A Robust and Reversible Watermarking Technique for Relational Dataset Based on Clustering," 2019 18th IEEE International Conference on Trust, Security and Privacy in Computing and Communications/13th IEEE International Conference on Big Data Science and Engineering, Aug. 5-8, 2019, Rotorua, New Zealand, pp. 411-418, 8 pages.

European Patent Office, Communication, Extended Search Report issued for European Patent Application No. 22290050.8, dated Feb. 7, 2023, 8 pages.

* cited by examiner

SYSTEM AND METHOD FOR IMPROVED WATERMARKING AND DATA TRACING

CROSS-REFERENCE TO RELATED APPLICATIONS

The present application claims the benefit of priority from European Patent Application No. 22290050.8, filed Sep. 2, 2022 and entitled "SYSTEM AND METHOD FOR IMPROVED WATERMARKING AND DATA TRACING," the disclosure of which is incorporated by reference herein in its entirety.

TECHNICAL FIELD

The present disclosure relates generally to improving traceability of shared data, and particularly to systems and methods for watermarking and fingerprinting data prior to sharing the data.

BACKGROUND

Electronic records and other types of data storage have exploded in popularity as more and more industries transition to digital and online records-keeping. For example, maintaining digital records instead of paper files improves portability and utility of the digital records as compared to paper records, such as by enabling the digital records to be easily shared with the subjects of the records (e.g., clients, customers, or the like) and parties that use the records (e.g., medical or legal professionals, vendors, or the like). However, one concern with the increased use and adoption of digital records is data privacy. Data privacy is especially important for confidential information, such as medical records, payment information, of other types of information or records that are desired to be kept private or that would be damaging to the subject of the record if the information was released.

One technique for addressing data privacy concerns is to perform de-identification on a dataset before the dataset is shared. De-identification involves removing or otherwise modifying personally identifiable information so that the information is no longer able to be tracked back to the person or subject the data describes. For example, names, personal identification numbers, and the like may be removed from data about people, and instead the data may be attributed to different people based on a non-identifiable characteristic or characteristics, such as a temporary location when the data was collected, one or more of the attributes themselves, or the like. However, such structured data de-identification is a one-time process that can be broken down over time, such as due to updates to the dataset, republishing of the dataset, adding new recipients to the sharing of the dataset, or publication of related datasets. Because these actions can occur, they should be considered as part of the data environment as a dynamic situation that can present new privacy risks. For example, publishing a related dataset, even if de-identified, may provide sufficient information when analyzed in combination with the original dataset to identify one or more subjects of the datasets. Another technique for addressing data privacy is to watermark data, such that the data can be traced back to an owner, or to fingerprint data, so that shared data may be traced back to an original recipient of the shared data. However, each of these techniques has their own challenges. For example, techniques for fingerprinting and watermarking data may replace a certain number of records of each of multiple portions of a dataset with a fingerprint or other watermarking data. However, because a few records in each portion are replaced with the same watermarking data, the watermarking may be relatively easy to detect. An easily detectable watermarking can be extracted by a hacker or other malicious actor to generate a clean, non-watermarked dataset, that can then be shared or modified in ways that are not desired, thereby avoiding the measure taken to maintain data privacy.

SUMMARY

Aspects of the present disclosure describe systems, methods, and computer-readable media that provide for improved watermarking and fingerprinting (also referred to as intelligent watermarking) for improving the traceability of shared data. To illustrate, a dataset that is to be shared may be provided for watermarking along with fingerprint data, such as a string, a numerical value, or the like, that identifies a target recipient of the dataset. Clustering may be performed on the dataset using a secret key that includes initial clustering parameters, such as a number of clusters, cluster centers, other parameters, or a combination thereof. The secret key (e.g., the initial clustering parameters) may be selected by a user or automatically generated by performance of the clustering algorithm. In some implementations, the clustering may be k-means clustering. In other implementations, other types of clustering may be used. After assigning each record (e.g., attribute) of the dataset to one of multiple clusters, a portion size of the fingerprint data may be determined based on the clusters and the records thereof. For example, the fingerprint data may be divided into portions having a size that is equal to a size of the fingerprint data divided by the number of clusters, a product of the number of clusters and the number of records per cluster to be watermarked, or the like.

After clustering the records of the dataset and determining the additional parameters, the records of each cluster are selected for embedding the fingerprint data. The selection may be based on one or more security parameters, such as a hash function, a priority of the various records, random selection, other security parameters, or the like. As an illustrative example, records of the dataset may be assigned to one of ten clusters, such that each cluster includes twenty records, and two records in each of the ten clusters may be selected using a hash function. Additionally, the fingerprint data may be divided into twenty portions. In this example, each of the selected records (e.g., attributes), or portions thereof, are replaced with corresponding portions of the fingerprint data to embed the fingerprint data throughout the dataset. Because the clustering occurs without reordering the dataset, the embedding appears random or pseudorandom without knowledge of the clusters, and therefore is difficult or impossible to detect without the secret key, unlike other watermarking techniques that embed data within records selected according to some static selection scheme that can be reverse-engineered by a malicious actor. Additionally, because the fingerprint data is embedded in the dataset to generate the watermarking, if the dataset is later leaked or otherwise attempted to be modified or passed off as belonging to another entity, the watermarking may be reversed based on the secret key and the fingerprint data may be extracted to identify the party from which the data was provided or stolen. Thus, the techniques described herein provide for improved traceability of datasets using watermarking that is more difficult to detect and reverse engineer than other types of watermarking, which can be useful in identifying parties that have been compromised or that perform improper actions with shared datasets.

In a particular aspect, a method for watermarking and fingerprinting datasets for sharing includes receiving, by one or more processors, user input that includes fingerprint data corresponding to a target recipient. The method also includes obtaining, by the one or more processors, a secret key. The secret key includes one or more initial clustering parameters. The method includes performing, by the one or more processors, clustering on a dataset based on the one or more initial clustering parameters to determine a plurality of clusters. The dataset includes a plurality of data records. The method also includes, for each cluster of the plurality of clusters, replacing, by the one or more processors, a portion of each of one or more records of the cluster with a corresponding portion of a plurality of portions of the fingerprint data to generate a watermarked dataset. The one or more records of each cluster are selected based on one or more security parameters. The method further includes outputting, by the one or more processors, the watermarked dataset to a device corresponding to the target recipient.

In another particular aspect, a system for watermarking and fingerprinting datasets for sharing includes a memory and one or more processors communicatively coupled to the memory. The one or more processors are configured to receive user input that includes fingerprint data corresponding to a target recipient. The one or more processors are also configured to obtain a secret key. The secret key includes one or more initial clustering parameters. The one or more processors are configured to perform clustering on a dataset based on the one or more initial clustering parameters to determine a plurality of clusters. The dataset includes a plurality of data records. The one or more processors are also configured to, for each cluster of the plurality of clusters, replace a portion of each of one or more records of the cluster with a corresponding portion of a plurality of portions of the fingerprint data to generate a watermarked dataset. The one or more records of each cluster are selected based on one or more security parameters. The one or more processors are further configured to output the watermarked dataset to a device corresponding to the target recipient.

In another particular aspect, a non-transitory computer-readable storage medium stores instructions that, when executed by one or more processors, cause the one or more processors to perform operations for watermarking and fingerprinting datasets for sharing. The operations include receiving user input that includes fingerprint data corresponding to a target recipient. The operations also include obtaining a secret key. The secret key includes one or more initial clustering parameters. The operations include performing clustering on a dataset based on the one or more initial clustering parameters to determine a plurality of clusters. The dataset includes a plurality of data records. The operations also include, for each cluster of the plurality of clusters, replacing a portion of each of one or more records of the cluster with a corresponding portion of a plurality of portions the fingerprint data to generate a watermarked dataset. The one or more records of each cluster are selected based on one or more security parameters. The operations further include outputting the watermarked dataset to a device corresponding to the target recipient.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure describe systems, methods, and computer-readable media that provide for improved watermarking and fingerprinting (also referred to as intelligent watermarking) for improving the traceability of shared data. Aspects described herein enable a user or a system to select initial clustering parameters that are used as a secret key, along with fingerprint data (e.g., an identifier of a recipient) to watermark and fingerprint a dataset. To illustrate, clustering may be performed on the dataset using the initial clustering parameters (e.g., the secret key), such as a number of clusters, cluster centers, other parameters, or a combination thereof. The clustering may be k-means clustering or another type of clustering. After assigning each record (e.g., attribute) of the dataset to a cluster, a portion size of the fingerprint data may be determined based on the clusters and the records thereof. Next, the records of each cluster may be selected for embedding the fingerprint data, with the selection based on one or more security parameters (e.g., a hash function, priority values, even/or selection, etc.). The selected records (or portions thereof) may be replaced with corresponding portions of the fingerprint data to embed the fingerprint data within different records as watermarking. Without knowledge of the type of clustering and the secret key (e.g., the initial clustering parameters), the watermarking is difficult or impossible to detect, thereby enabling data to be fingerprinted and watermarked to prove ownership and to trace from which recipient a dataset in question was obtained from.

Figure 1:
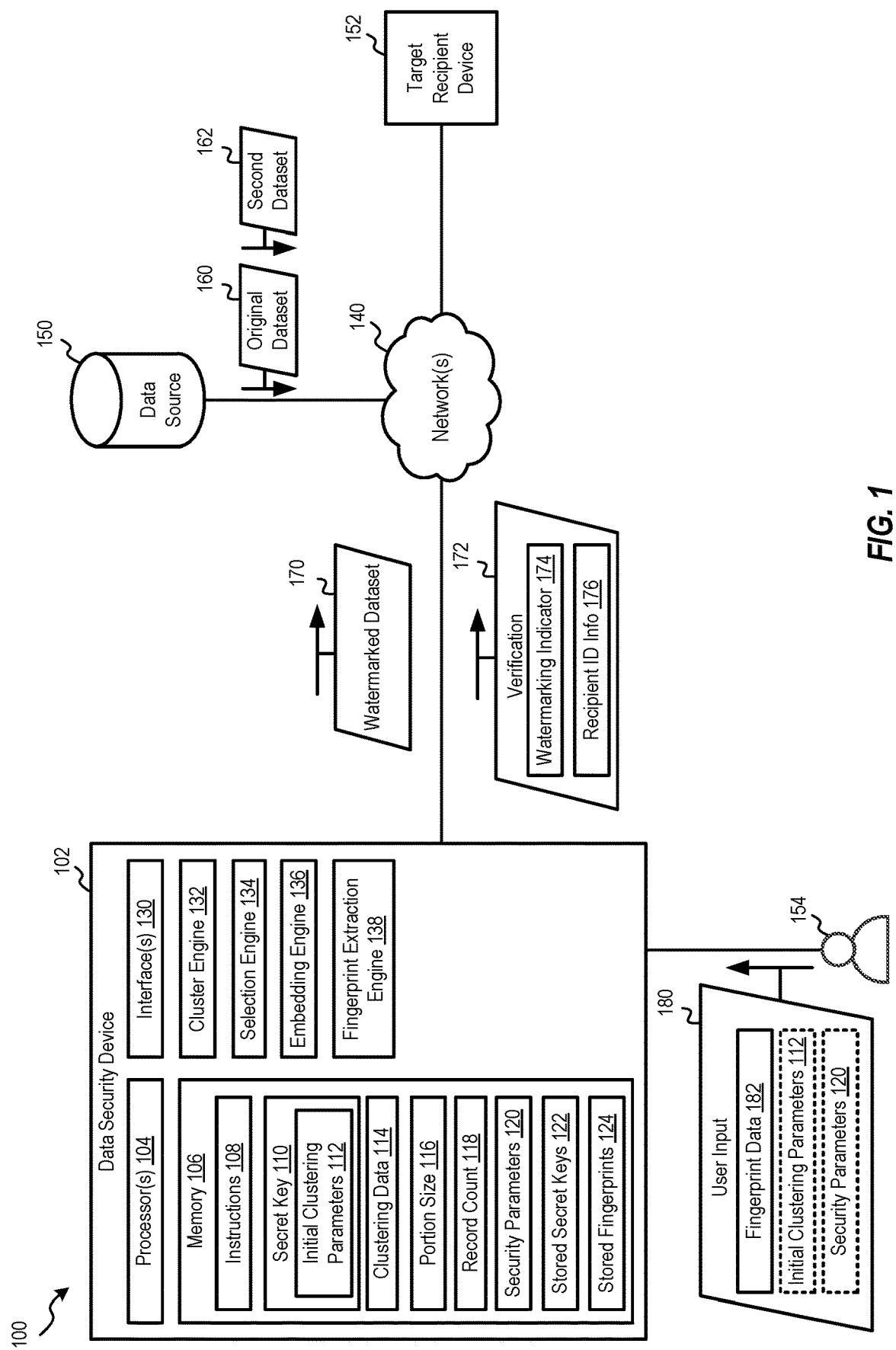
FIG. 1 is a block diagram of an example of a system that supports watermarking and fingerprinting datasets for sharing according to one or more aspects.

Referring to FIG. 1, an example of a system that supports watermarking and fingerprinting datasets for sharing according to one or more aspects is shown as a system 100. As shown in FIG. 1, the system 100 includes a data security device 102, a data source 150, a target recipient device 152 (e.g., a network device), a user 154, and one or more networks 140. In some implementations, the system 100 may include additional components that are not shown in FIG. 1, such as one or more additional recipient or network devices, additional data sources, and/or additional users or user devices (e.g., client devices), as non-limiting examples.

The data security device 102 may be configured to watermark and fingerprint datasets to be shared and to verify whether a received dataset is watermarked and to extract fingerprint data from received datasets, if the datasets are watermarked and fingerprinted using the same techniques used by the data security device 102. The data security device 102 includes or corresponds to a server, a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other computing devices, or a combination thereof, as non-limiting examples. The data security device 102 includes one or more processors 104, a memory 106, one or more communication interfaces 130, a cluster engine 132, a selection engine 134, an embedding engine 136, and a fingerprint extraction engine 138. In some other implementations, one or more of the components are optional, one or more additional components are included in the data security device 102, or both. It is noted that functionalities described with reference to the data security device 102 are provided for purposes of illustration, rather than by way of limitation, and that the exemplary functionalities described herein may be provided via other types of computing resource deployments. For example, in some implementations, computing resources and functionality described in connection with the data security device 102 may be provided in a distributed system using one or more servers or other computing devices, or in a cloud-based system using computing resources and functionality provided by a cloud-based environment that is accessible over a network, such as the one of the one or more networks 140. To illustrate, one or more operations described herein with reference to the data security device 102 may be performed by one or more servers or a cloud-based system that communicates with one or more client or user devices in order to facilitate watermarking and sharing of datasets.

The one or more processors 104 includes one or more microcontrollers, application specific integrated circuits (ASICs), field programmable gate arrays (FPGAs), central processing units (CPUs) having one or more processing cores, or other circuitry and logic configured to facilitate the operations of the data security device 102 in accordance with aspects of the present disclosure. The memory 106 includes random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the data security device 102 are stored in the memory 106 as instructions 108 that, when executed by the one or more processors 104, cause the one or more processors 104 to perform the operations described herein with respect to the data security device 102, as described in more detail below. Additionally, the memory 106 is configured to store data and information, such as a secret key 110, clustering data 114, a portion size 116, a record count 118 (e.g., an attribute count), one or more security parameters (referred to herein as "security parameters 120"), stored secret keys 122, and stored fingerprints 124. Illustrative aspects of the secret key 110, the clustering data 114, the portion size 116, the record count 118, the security parameters 120, the stored secret keys 122, and the stored fingerprints 124 are described in more detail below.

The one or more communication interfaces 130 are configured to communicatively couple the data security device 102 to the one or more networks 140 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). In some implementations, the data security device 102 includes one or more input/output (I/O) devices that include one or more display devices, a keyboard, a stylus, one or more touchscreens, a mouse, a trackpad, a microphone, a camera, one or more speakers, haptic feedback devices, or other types of devices that enable a user to receive information from or provide information to the data security device 102. In some implementations, the data security device 102 is coupled to a display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in the data security device 102. For example, in some implementations, the user 154 may interact with the data security device 102 via the one or more I/O devices and the display device. In some other implementations, the data security device 102 is communicatively coupled to one or more client devices that include or are coupled to respective display devices. For example, the user 154 may interact with the data security device 102 by using a user device or client device to communicate with the data security device 102 via the networks 140.

The cluster engine 132 is configured to perform clustering on records (e.g., attributes) of datasets to assign each record to one of multiple clusters based on underlying similarities of the records. For example, the cluster engine 132 may be configured to receive the secret key 110 and use the secret key 110 to perform a clustering algorithm on a dataset to assign records of the dataset to one of multiple clusters. As non-limiting examples, the clustering algorithm may include k-means clustering, k-modes clustering, means-shift clustering, density-based spatial clustering of applications with noise (DBSCAN), expectation-maximization (EM) clustering using Gaussian mixture models (GMM), hierarchical clustering, agglomerative clustering, spectral clustering, balanced iterative reducing and clustering (BIRCH), ordering points to identify the clustering structure (OPTICS), or the like. In some implementations, the clustering is performed based on a set of initial clustering parameters 112 included in the secret key 110, such as parameters received from the user 154, as further described herein. In some other implementations (e.g., in implementations in which the secret key 110 is null or does not include all the expected parameters), the clustering is performed using a random set of initial parameters or a default set of initial parameters that correspond to the type of clustering algorithm used, and the clustering is performed for multiple iterations or until a particular metric is reached or optimized. In such implementations, the clustering parameters associated with reaching or optimizing the metric are used as the initial cluster parameters 112 of the secret key 110. The cluster engine 132 is configured to perform clustering on datasets as part of a watermarking process or on received datasets as part of a verification process to determine whether the received datasets have been watermarked. In implementations in which the clustering is performed to verify whether a received dataset is watermarked, the cluster engine 132 may be configured to perform clustering on the received dataset multiple different times using multiple stored secret keys (e.g., the stored secret keys 122) or based on a particular stored secret key. For both the watermarking and the verifying watermarking implementations, the cluster engine 132 is configured to output the clustering data 114 that indicates the assignments of records to multiple clusters without actually changing an ordering of the dataset being clustered (e.g., the assignment of records to clusters is determined, but the dataset is not modified by the clustering process).

The selection engine 134 is configured to select one or more records of each cluster into which portions of fingerprint data are to be embedded. For example, the selection engine 134 may receive a dataset to be watermarked or to be verified and the clustering data 114 output by the cluster engine 132 as inputs, and the selection engine 134 may output identification of the records selected for embedding fingerprint data or selected as containing embedded fingerprint data. In some implementations, the selection engine 134 is configured to select the record(s) of each cluster based on the security parameters 120 (e.g., one or more security parameters). The security parameters 120 may include or correspond to hash functions, priorities corresponding to the records, even/odd selection parameters or schemes, null data selection parameters, parity matching, other security parameters, or a combination thereof. Additionally or alternatively, the security parameters 120 may include or correspond to parameters that indicate the size of portions of records (or the number of records) that may be replaced by fingerprint data, such as field sizes, accuracy or precision parameters, record sizes, other parameters, or the like. As a non-limiting example, the security parameters 120 may include a hash function, and the selection engine 134 may apply the hash function to a record identifiers (e.g., ordinal numbers or other identifiers assigned to each record to identify the respective record) to determine one or more records in each cluster to select for embedding portion(s) of fingerprint data. Additionally or alternatively, the selection engine 134 may be configured to identify records in each cluster of a received data set that, if the received dataset is watermarked, contain embedded fingerprint data. As part of selecting the records, the selection engine 134 is configured to determine the number of records (e.g., the record count 118) in each cluster to undergo replacement and/or the size of the portions of the records that to undergo replacement, the portion size 116 of portions of fingerprint data to embed within the selected records, or any combination thereof, as further described herein.

The embedding engine 136 is configured to embed fingerprint data into records of each cluster identified by the selection engine 134. For example, the embedding engine 136 may receive a dataset to be watermarked, fingerprint data, the clustering data 114 output by the cluster engine 132, and the portion size 116 and the records selected (e.g., identified) by the selection engine 134 as input, and the embedding engine 136 may output a watermarked dataset in which portions of the fingerprint data are embedded in the identified records (or portions thereof). Embedding the fingerprint data may include dividing the fingerprint data into multiple portions each having the portion size 116, and replacing the identified record(s) (or portion(s) thereof) with corresponding portion(s) of the fingerprint data. As a non-limiting example, if the cluster engine 132 assigns forty records of a dataset to ten clusters that each include four records, and the selection engine 134 selects a particular record of each cluster for embedding, the embedding engine 136 may divide the fingerprint data into ten portions having the portion size 116 and replace each identified record (or a portion thereof) with a corresponding one of the ten portions of the fingerprint data to embed the fingerprint data throughout the dataset. The embedded fingerprint data acts as both a watermark for the dataset and as a fingerprint that identifies or corresponds to a target recipient of the data set (or any other entity or information identified by the fingerprint data). Although described as dividing the fingerprint data into multiple portions having the same size (e.g., the portion size 116), in some other implementations, records of different clusters may be embedded with different size portions of the fingerprint data and/or different records in the same cluster may be embedded with different size portions of the fingerprint data. For example, lower priority clusters or records may be embedded with larger portions of fingerprint data than higher priority clusters or records, as a non-limiting example. In some implementations, replacing the selected records (or portions thereof) includes updating error correcting code (ECC) data, parity data, or the like, based on the modification. Alternatively, replacing the selected records may include replacing parity data, ECC data, or the like, with parity or ECC data based on the portion of the fingerprint data to be embedded or a combination of the record (or portions thereof) and the portion of the fingerprint data to be embedded.

The fingerprint extraction engine 138 is configured to extract fingerprint information embedded in received datasets. For example, the fingerprint extraction engine 138 may receive a received dataset, the clustering data 114 output by the cluster engine 132, the portion size 116, and the selected records for each of the clusters identified by the selection engine 134 as inputs, and the fingerprint extraction engine 138 may output extracted fingerprint data, an indication of whether the extracted fingerprint data matches a fingerprint stored at the data security device 102, information associated with a matching fingerprint (if one is identified), or a combination thereof. To illustrate, the fingerprint extraction engine 138 may extract portions of fingerprint data from clusters in a particular order (e.g., based on a parameter of a secret key, such as ordinal identifies of the clusters) and combine the extracted portions to generate extracted fingerprint data. In some implementations, the fingerprint extraction engine 138 compares the extracted fingerprint data to the stored fingerprints 124 to determine whether the extracted fingerprint data matches a stored fingerprint. If a match is detected, the fingerprint extraction engine 138 may output an indication of a match, information that corresponds to the matching stored fingerprint, such as a target recipient or other entity or information identified by the fingerprint, or a combination thereof. If a match is not detected, the fingerprint extraction engine 138 may output an indication of no match, which may indicate that the extracted fingerprint data is not recognized or that the received dataset is not watermarked, at least using the watermarking performed by the data security device 102.

The data source 150 (e.g., one or more data sources) is configured to be accessible to the data security device 102 via the one or more networks 140 to enable retrieval of data, such as datasets to be watermarked, datasets to be verified whether watermarking is detected, or both. The data source 150 may include or correspond to a database, cloud storage, external storage, or the like, or to a computing device, such as a desktop computing device, a server, a laptop computing device, a personal computing device, another computing device, or a combination thereof, as non-limiting examples. As a non-limiting example, the data source 150 may be a database that stores datasets that are created during performance of day-to-day operations of an enterprise, some of which may be intended to be shared with others within or external to the enterprise.

The target recipient device 152 is configured to communicate with the data security device 102, the data source 150, or both, via the one or more networks 140 to receive watermarked data to designated for sharing with the target recipient device 152. For example, the target recipient device 152 may be a device associated with a partner of the enterprise, a vendor, customer, or other entity that cooperates with the entity, an educational institution (e.g., if datasets are shared for research or publishing purposes), a remote employee of the enterprise, or any other entity with whom the enterprise elects to share a dataset. The target recipient device 152 may include or correspond to a computing device, such as a desktop computing device, a server, a laptop computing device, a personal computing device, a tablet computing device, a mobile device (e.g., a smart phone, a tablet, a PDA, a wearable device, and the like), a VR device, an AR device, an XR device, a vehicle (or component(s) thereof), an entertainment system, another computing device, or a combination thereof, as non-limiting examples. Although depicted as a single device, in some other implementations, the target recipient may be associated with multiple devices or with an account that enables access to a shared dataset via any publicly or privately accessible computing device.

The user 154 includes a user of the data security device 102, such as an employee or member of the enterprise that owns the datasets to be shared, or in the case of an individual owner, the individual themselves. In some implementations, the user 154 may interact directly with the data security device 102, such as via one or more I/O devices, a display device, or the like. In other implementations, the user 154 interacts with the data security device 102 via a user device (e.g., a client device) that communicates with the data security device 102 via the networks 140.

During operation of the system 100, the data security device 102 may receive a dataset to be watermarked, such as an original dataset 160, from the data source 150. The original dataset 160 includes a plurality of records (e.g., a plurality of attributes). For example, the original dataset 160 may include or correspond to customer data, payment data, health data, operations data, or any other type of dataset for which traceability of the dataset is desirable. In some implementations, the original dataset 160 has already undergone de-identification (e.g., personally identifiable information has been removed, modified, or otherwise obfuscated) prior to receipt by the data security device 102. Alternatively, the data security device 102 may perform de-identification operations on the original dataset 160 to de-identify parties or entities represented by the original dataset 160.

The data security device 102 may begin a watermarking and fingerprinting process by requesting fingerprint data and other parameters from the user 154. For example, the data security device 102 may cause display of a graphical user interface (GUI) or other user interface that requests the user 154 to provide fingerprint data for embedding in the original dataset 160 as a watermark, and optionally for parameters such as clustering parameters, security parameters, or both, for use during the watermarking and fingerprinting process. Responsive to display of the GUI, the data security device 102 may receive user input 180 from the user 154. The user input 180 includes or identifies a location of fingerprint data 182 to be embedded within the original dataset 160. The fingerprint data 182 corresponds to or identifies a target recipient of the original dataset 160 after watermarking (e.g., a user of the target recipient device 152). For example, the fingerprint data 182 may include an identifier, such as a text string, a numeric value, or some other value that corresponds to or identifies the target recipient. Additionally or alternatively, the fingerprint data 182 may be any information that is desired to be embedded in the original dataset 160 to distinguish the identity of the original dataset 160 from other datasets, such as a volume number, a timestamp or date, an author of the data, a serial number, other identification or archival information, or the like. In some implementations, the data security device 102 may condition acceptance of the fingerprint data 182 based on a data type of the fingerprint data 182 matching the data type of the records represented by the original dataset 160. In some such implementations, if the data types match, the data security device 102 accepts the fingerprint data 182 and store it at the memory 106 (or in temporary storage) to be used during the watermarking and fingerprinting process. Alternatively, if the data types do not match, the data security device 102 rejects the fingerprint data 182 and may provide the user 154 with an error message or indication that the fingerprint data 182 is not accepted because the data types do not match. In some such implementations, the data security device 102 provides an indication of the data type of the records represented by the original dataset 160 to the user 154 to reduce the likelihood of receiving additional fingerprint data having a different data type. For example, if the original dataset 160 includes records of numerical data and the fingerprint data 182 includes a numerical identifier, the data security device 102 may accept the fingerprint data 182. As another example, if the original dataset 160 includes records of numerical data and the fingerprint data 182 includes a text string, the data security device 102 may reject the fingerprint data 182 and provide the user 154 with a message to provide a fingerprint that matches the records of the original dataset 160 (e.g., a numerical fingerprint, in this example).

Continuing with the watermarking and fingerprinting process, the data security device 102 performs clustering on the original dataset 160 based on the secret key 110 to assign the records of the original dataset 160 to multiple clusters. For example, the cluster engine 132 may perform a clustering algorithm on the records of the original dataset 160 using the initial clustering parameters 112 included in the secret key 110. In some implementations, the clustering performed by the cluster engine 132 (e.g., the clustering algorithm) is k-means clustering. In some other implementations, the clustering algorithm may include k-modes clustering, means-shift clustering, DBSCAN, EM clustering using GMM, hierarchical clustering, agglomerative clustering, spectral clustering, BIRCH, OPTICS, or the like. The initial clustering parameters 112 may include a count of clusters to be assigned during the clustering, centers of clusters, other initial clustering parameters, or a combination thereof. In some implementations, the data security device 102 obtains the secret key 110 based in input from the user 154 prior to performing the clustering on the original dataset 160. For example, the user input 180 may include the initial clustering parameters 112. To further illustrate, in addition to including a prompt for fingerprint data, the GUI displayed by the data security device 102 may include requests for a type of clustering, a number of clusters, centers of clusters, other clustering parameters, or a combination thereof, and the user 154 may provide responses to the requests that are received by the data security device 102 as the initial clustering parameters 112 included in the user input 180. In some other implementations, the cluster engine 132 may perform the clustering on the original dataset 160 using default or randomly selected values for the initial clustering parameters 112, and the clustering may be performed for multiple iterations or for a duration of time until one or more criteria are satisfied or optimized. For example, k-means clustering may be performed using a set of initial parameters, and iterations of k-means clustering may continue until the sum of squared error (SSE) between each member of each cluster and the cluster centroid is minimized (e.g., optimized), or until a change in the SSE between iterations fails to satisfy a threshold. In this example, the clustering parameters after the last iteration may be stored as or otherwise included as the initial clustering parameters 112 of the secret key 110. Performance of the clustering on the original dataset 160 assigns each record (e.g., attribute) of the original dataset 160 to one of multiple clusters based on similarities (e.g., distances) between the record and the clusters in a feature space. The count of clusters, the centroids of the clusters, the members of each cluster (e.g., the records assigned to each cluster), and the like, are output by the cluster engine 132 as the clustering data 114. Performance of the clustering does not reorder or modify an ordering of the records in the original dataset 160. Instead, performance of the clustering generates the clustering data 114 as additional data that indicates the assignment of the records to the various clusters.

After performing the clustering, the data security device 102 selects one or more records of each cluster in which to embed corresponding portions of the fingerprint data 182. For example, the original dataset 160, the clustering data 114, and the security parameters 120 are provided as input data to the selection engine 134, and the selection engine 134 selects one or more records of each cluster based on the one or more security parameters 120. The security parameters 120 may include hash functions, priorities corresponding to data records, even/odd selection parameters or schemes, null data selection parameters, parity matching, other security parameters, or a combination thereof. For example, the selection engine 134 may apply a hash function to the records in a cluster to generate hash values, and records that correspond to one or more particular hash values may be selected. In this example, the hash function may be the same or different for each cluster. As another example, the selection engine 134 may select even numbered records from an ordinal list of records in each cluster or records that include null values, as other non-limiting examples. If the same security parameters are used for each cluster, the same records may be selected in each cluster. Alternatively, if different security parameters are used for each cluster, one or more different records may be selected for at least some of the clusters. In some implementations, the data security device 102 receives the security parameters 120 from the user 154. For example, the user input 180 may include the security parameters 120. To further illustrate, in addition to including a prompt for fingerprint data (and optionally initial clustering parameters), the GUI displayed by the data security device 102 may include a request for one or more security parameters (e.g., parameters, selection schemes, criteria, etc.) to be used to select records for embedding fingerprint data, and the user 154 may provide responses to the request that are received by the data security device 102 as the security parameters 120 included in the user input 180. Alternatively, the security parameters 120 may be preprogrammed at the data security device 102 or otherwise received and stored at the data security device 102 or automatically selected by the data security device 102 from a plurality of stored security parameters based on one or more criteria. In such implementations, the criteria may include a data type of records of the original dataset 160, a degree of traceability selected by the user 154, a target recipient for shared data, other criteria, or a combination thereof.

In some implementations, the data security device 102 selects a particular number of records in each cluster (e.g., the record count 118) to undergo replacement. The selection engine 134 may determine the record count 118 based on the security parameters 120, a data record size (e.g., of the records of the original dataset 160), and a size of the fingerprint data 182. To illustrate, the selection engine 134 may determine a size of a portion of each record that may be replaced such that one or more of the security parameters 120 are still satisfied. For example, the original dataset 160 may include multiple ten bit records, and a record may fail to satisfy a particular security parameter if more than two bits are replaced. The determination may be based on the security parameters 120 or aspects of the records themselves, such as types of records, priority of records, sizes of records, whether the records contain data or null values, or the like, and the determination represents an upper bounds on the size of record portions that can be replaced. The selection engine 134 may divide the size of the fingerprint data 182 by the count of clusters indicated by the clustering data 114 to determine the size of a partition of the fingerprint data 182 to be assigned to each cluster. The selection engine 134 may determine the record count 118 by dividing the size of the fingerprint partition assigned to each cluster by the size of the record portions that can be replaced. For example, if there are ten clusters, the fingerprint data 182 is forty bits, and the maximum portion of each record that can be replaced is two bits, the record count 118 is two (e.g., the selection engine 134 determines to replace two bits of two records in each cluster with a corresponding two bits of the fingerprint data 182). The selection engine 134 may select the number of records determined in this manner for each cluster based on the security parameters 120. For example, in the above-described example of selecting records based on a hash function, the selection engine 134 may select two records in each cluster that have the same hash value based on the record count 118 being two. Additionally, the selection engine 134 may determine the portion size 116 of each portion of the fingerprint data 182 to be embedded in the original dataset 160 based on the record count 118, the count of clusters, and the size of the fingerprint data 182. For example, the selection engine 134 may divide the size of the fingerprint data 182 by the product of the count of clusters and the record count 118 to determine the portion size 116. As in the above example, if the record count 118 is two, the count of clusters indicated by the clustering data 114 is ten, and the size of the fingerprint data 182 is forty, the portion size 116 is two (e.g., forty/(ten*two)=two). The selection engine 134 may output identification of the selected records and the portion size 116 for use during a remainder of the watermarking and fingerprinting process.

After selecting one or more records in each cluster, the data security device 102 embeds a portion of the fingerprint data 182 into each of the selected records of the clusters to watermark the original dataset 160. For example, the embedding engine 136 receives the identification of the selected records, the clustering data 114, the portion size 116, the fingerprint data 182, and the original dataset 160, and the clustering engine 136 embeds a portion of the fingerprint data 182 having the portion size 116 into each of the identified records (or portions thereof). In some implementations, each portion of the fingerprint data 182 is embedded into a single record (e.g., no record is embedded with the same portion of the fingerprint data 182). In some other implementations, one or more records may be embedded with the same portion of the fingerprint data 182, and indication of the repetition may be included in the secret key 110. Embedding the portions of the fingerprint data 182 in selected records (or portions thereof) may cause replacement of the selected records (or portions thereof) with the corresponding portions of the fingerprint data 182. For example, if the original dataset 160 is represented as a table with each row indicating a record and each column indicating a field or other element of the record, embedding a particular portion of the fingerprint data 182 in a record corresponding to a particular row may cause entries in one or more columns of the particular row to be replaced with the particular portion of the fingerprint data 182. In some implementations, an entirety of a record is replaced (e.g., all entries in a row). In some other implementations, a portion that is less than an entirety is replaced (e.g., the entries in one or more columns of the row). An example of embedding fingerprint data into a dataset as a watermark is further described herein with reference to FIG. 2. After embedding the portions of the fingerprint data 182 in the selected records, the embedding engine 136 outputs a watermarked dataset 170.

Embedding the fingerprint data 182 in the original dataset 160 as a watermark generates the watermarked dataset 170. The watermarked dataset 170 may be similar to the original dataset 160 except that particular portions of particular records are replaced with corresponding portions of the fingerprint data 182. The data security device 102 may share the watermarked dataset 170 with a target recipient. For example, the data security device 102 may output the watermarked dataset 170 to the target recipient device 152, such as by sending the watermarked dataset 170 to the target recipient device 152 via the networks 140 or by storing the watermarked dataset 170 at the data source 150 or another storage location that is accessible to the target recipient device 152. Because the watermarked dataset 170 is watermarked using the fingerprint data 182 that identifies the target recipient, if the enterprise that shares the watermarked dataset 170 later identifies a dataset they believe to be an improperly shared version or a modified version of the original dataset 160, the data security device 102 can verify that this dataset is watermarked, and therefore belongs to the enterprise. Additionally, if the dataset is watermarked, the data security device 102 can extract the fingerprint data 182 to determine that this dataset originated (e.g., before improper modification or sharing) as the watermarked dataset 170 that was shared with the target recipient device 152. However, because the fingerprint data 182 is embedded in different records that are selected based on clustering and the security parameters 120 to form the watermarking, the watermarking is difficult or impossible to detect by other devices that do not possess the secret key 110 (e.g., the initial clustering parameters 112) and the security parameters 120.

In addition to watermarking and fingerprinting data, the data security device 102 can verify whether a dataset is watermarked using the same watermarking and fingerprinting process described above and, if the dataset is watermarked, the data security device 102 may extract a fingerprint from the dataset. To illustrate, the data security device 102 may obtain a second dataset 162 (e.g., a shared dataset for watermarking verification), such as from the data source 150, the target recipient device 152, the user 154, or another storage location or device. To verify whether the second dataset 162 is watermarked, the data security device 102 may perform clustering on the second dataset 162 based on one or more second initial clustering parameters of a second secret key to generate second clustering data that indicates assignment of records of the second dataset 162 to multiple clusters. For example, the cluster engine 132 may perform a clustering algorithm on the second dataset 162, similar to the above-described clustering of the original dataset 160. In some implementations, the data security device 102 is configured to use a single secret key (e.g., the secret key 110) for all clustering operations. In such implementations, the cluster engine 132 performs the clustering on the second dataset 162 based on the initial clustering parameters 112 included in the secret key 110. Thus, in at least some implementations, the cluster engine 132 performs clustering on the original dataset 160 and the second dataset 162 based on the same secret key (e.g., the secret key 110). In some other implementations, the data security device 102 stores multiple secret keys (e.g., the stored secret keys 122, which may include the secret key 110) that may be used to perform clustering operations. In such implementations, the data security device 102 performs an iteration of the watermarking verification process for each of the stored secret keys 122. For example, for each of the stored secret keys 122, the cluster engine 132 may perform clustering on the second dataset 162 based on initial clustering parameters included in the stored secret key to generate corresponding clustering data (in addition to performing the verification and extraction operations described below). Thus, in at least some implementations, the cluster engine 132 performs clustering on the second dataset 162 using a different secret key than the secret key 110 that is used to perform clustering on the original dataset 160.

After performing clustering using one or more secret keys to generate one or more sets of clustering data, the data security device 102 selects one or more records of each cluster that should contain embedded portions of a fingerprint if the second dataset 162 is watermarked. For example, for each cluster, the selection engine 134 selects one or more records which may contain watermarking (e.g., embedded portions of a fingerprint) based on one or more security parameters, similar to the selection of records in the clusters of the original dataset 160 based on the security parameters 120, as described above. As a non-limiting example, the one or more security parameters may include a hash function, and the selection engine 134 may select one or more records in each cluster that correspond to the same or to particular hash values. Additionally, the selection engine 134 may determine a size of portions of the selected records that may contain the embedded fingerprint data, similar to as described above with reference to the selection engine 134 determining a size of portions of selected records in which to embed portions of the fingerprint data 182. In some implementations, the selection engine 134 selects records of each cluster of the second dataset 162 based on the security parameters 120 used to select records of the clusters of the original dataset 160 (e.g., based on the same security parameters). In some other implementations, the selection engine 134 selects records of each cluster of the second dataset 162 based on different security parameters than the security parameters 120, such as security parameters indicated by a corresponding secret key, security parameters selected based on a data type of the second dataset 162, security parameters selected by the user 154, or the like.

After selecting the records of each cluster that may contain embedded fingerprint data, the data security device 102 extracts portions of the selected records to generate a candidate fingerprint for comparison with the stored fingerprints 124 to determine whether the second dataset 162 is watermarked. For example, the fingerprint extraction engine 138 may extract the portions of the selected records and combine the extracted portions to generate a candidate fingerprint. The portions may be combined based on the order of the clusters (e.g., if each cluster has one selected record, an extracted portion from a record of a second cluster may be appended to an extracted portion from a record of a first cluster, and this processes continues in order of cluster identifiers) or a combination of the order of the clusters and the order of the records within the clusters (e.g., an extracted portion from a second record of a first cluster may be appended to an extracted portion of a first record of the first cluster), or the portions may be combined based on some other ordering, such as an ordering indicated by the corresponding secret key used to assign the records to the clustered or a prestored or user-provided ordering. Once the candidate fingerprint is generated, the fingerprint extraction engine 138 compares the candidate fingerprint to the stored fingerprints 124 to determine whether the candidate fingerprint matches one of the stored fingerprints 124. If a match is detected, the second dataset 162 is watermarked. However, if the candidate fingerprint does not match any of the stored fingerprints 124, the second dataset 162 is not watermarked, at least using the watermarking and embedding process performed by the data security device 102.

The data security device 102 generates at least one output based on the determination of whether the second dataset 162 is watermarked. For example, the data security device 102 may output a verification 172, such as causing display of the verification 172 to the user 154 (e.g., via a display of the data security device 102 or a user device of the user 154) or by sending the verification 172 to one or more other devices via the networks 140. The verification may include a watermarking indicator 174 that indicates whether watermarking is detected in the second dataset 162 (e.g., whether the candidate fingerprint matches one of the stored fingerprints 124). In some implementations, if watermarking is detected, the data security device 102 may identify an intended recipient of an original (e.g., unmodified or unshared) version of the second dataset 162. For example, the fingerprint extraction engine 138 may identify a particular stored fingerprint of the stored fingerprints 124 that matches the candidate fingerprint, and the fingerprint extraction engine 138 may identify an intended recipient of the second dataset 162 that is identified by or corresponds to the particular stored fingerprint. For example, if the particular stored fingerprint is the fingerprint data 182, the intended recipient is identified as the user associated with the target recipient device 152. In such implementations, the verification 172 includes recipient identifier (ID) information 176 that identifies the target recipient that corresponds to the matching stored fingerprint. In some implementations, the data security device 102 may generate non-watermarked data based on the second dataset 162 if the second dataset 162 is watermarked. For example, the data security device 102 may compare the second dataset 162 to one or more original datasets stored at the data source 150 and the data security device 102 may replace the portions of the selected records that contain the watermarking with the corresponding portions of the closest matching original dataset. As another example, the corresponding secret key may include or indicate the replaced portions of the corresponding original dataset, and the data security device 102 may replace the embedded fingerprint portions with the replaced portions. Other techniques for reversing the watermarking of the second dataset 162 are also possible based on information stored at the data security device 102, datasets stored at the data source 150, information received from the user 154, other information, or a combination thereof.

In a particular implementation, a system (e.g., 100) for watermarking and fingerprinting data is disclosed. The system includes a memory (e.g., 106) and one or more processors (e.g., 104) communicatively coupled to the memory. The one or more processors are configured to receive user input (e.g., 180) that includes fingerprint data (e.g., 182) corresponding to a target recipient. The one or more processors are also configured to obtain a secret key (e.g., 110). The secret key includes one or more initial clustering parameters (e.g., 112). The one or more processors are configured to perform clustering on a dataset (e.g., 160) based on the one or more initial clustering parameters to determine a plurality of clusters (e.g., 114). The dataset includes a plurality of data records. The one or more processors are also configured to, for each cluster of the plurality of clusters, replace a portion of each of one or more records of the cluster with a corresponding portion of a plurality of portions of the fingerprint data to generate a watermarked dataset (e.g., 170). The one or more records of each cluster are selected based on one or more security parameters (e.g., 186). The one or more processors are further configured to output the watermarked dataset to a device (e.g., 152) corresponding to the target recipient.

As explained above, the system 100 supports watermarking and fingerprinting data to improve traceability of shared data. The watermarking is based on clustering performed using a set of clustering parameters that are not shared with others. Because the clustering occurs without reordering the original dataset 160 and based on the initial clustering parameters 112 that are not known to other entities, the records (or portions thereof) that are selected for embedding are difficult or impossible to detect by other entities. For example, without advance knowledge of the secret key 110 (e.g., the initial clustering parameters 112), the clusters resulting from performance of the clustering by the cluster engine 132 are difficult or impossible to reverse-engineer, and thus the records selected for embedding based on the clustering appear random (or pseudorandom). Thus, the watermarking process performed by the data security device 102 may prevent detection of the watermarking in the watermarked dataset 170 by watermarking identification techniques that look for patterns of embedded data (e.g., unexpected or different data that may not be part of the records). Additionally, because the fingerprint data 182 is embedded in the records (or portions thereof) to generate the watermarking, if the watermarked dataset 170 is leaked, modified, or passed off as belonging to another entity, the data security device 102 may detect the watermarking, as described above with reference to detecting watermarking in the second dataset 162 using the stored secret keys 122 and the stored fingerprints 124. By matching a candidate fingerprint extracted from a received dataset to one of the stored fingerprints 124, the data security device 102 may identify the party to which watermarked data was originally provided, thereby identifying a source of a leak or a data breach, or an action in bad faith by the recipient party. Thus, the system 100 provides for improved traceability of datasets using a process of watermarking and fingerprint embedding that is more difficult to detect and reverse engineer than other types of watermarking, which can be useful in identifying parties that have been compromised or that perform improper actions with shared datasets, as well as proving ownership of datasets in question.

Figure 2:
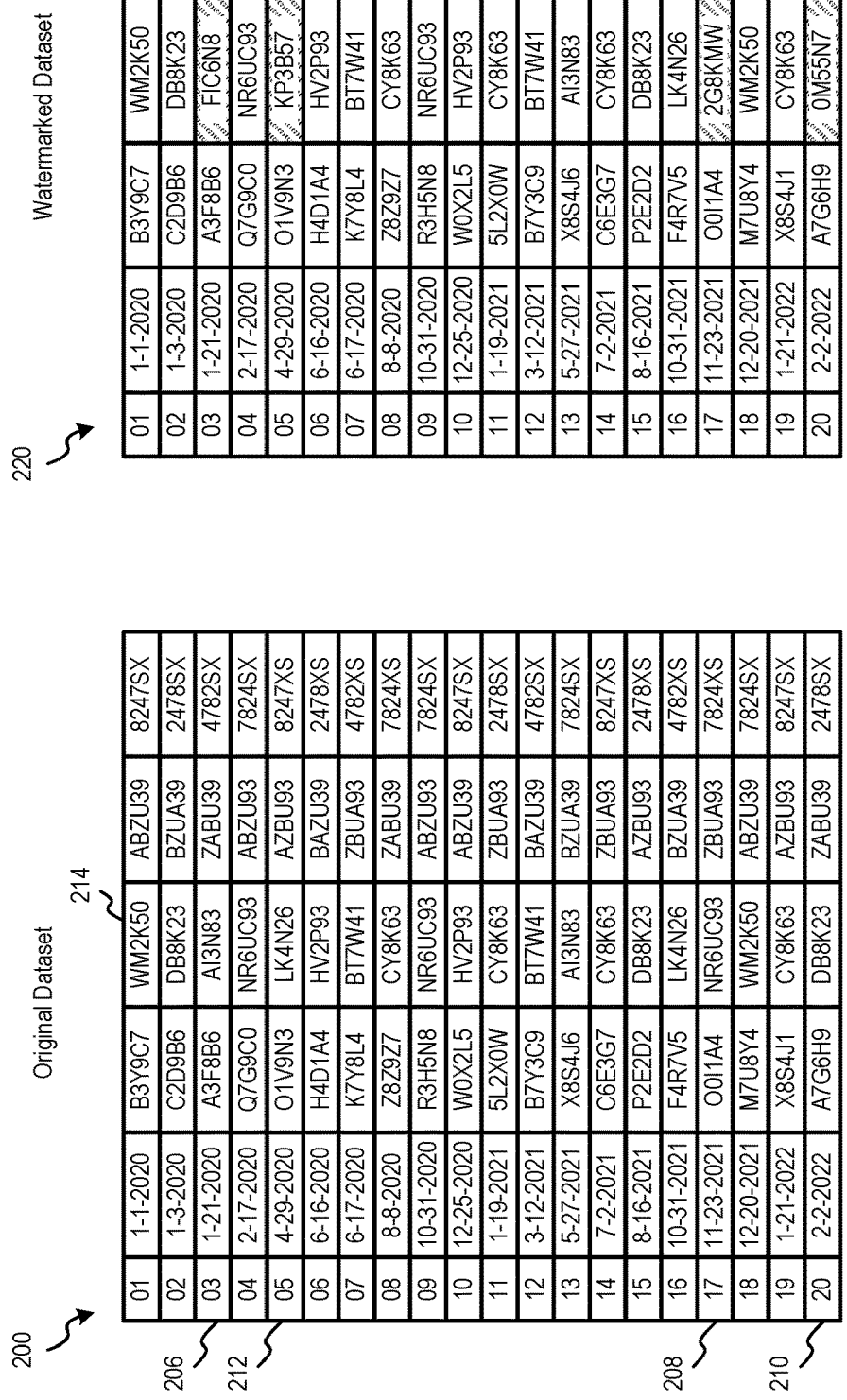
FIG. 2 shows an example of watermarking and fingerprinting a dataset according to one or more aspects.

FIG. 2 illustrates an example of watermarking and fingerprinting a dataset according to one or more aspects. FIG. 2 illustrates an original dataset 200, which may include or correspond to the original dataset 160 of FIG. 1 in some implementations. In the example shown in FIG. 2, the original dataset 200 includes twenty records that each include six fields of alphanumeric data. The original dataset 200 is illustrated as a table with each row representing a record and each column representing a field of the corresponding record. For example, the first column represents a record ID field.

Upon performing clustering on the original dataset 200 using the clustering described above with reference to FIG. 1, the clustering data 202 is generated. The clustering data 202 indicates that, in the example shown in FIG. 2, the records of the original dataset 200 were assigned to four clusters that each include five records. Fingerprint data 204 to be embedded in the original dataset 200 is a string of twenty four alphanumeric characters. As described with reference to FIG. 1, one or more records from each cluster may be selected and verified based on security parameters. In the example shown in FIG. 2, it is determined that one record per cluster is to be selected, and that one field in each cluster is to be selected for embedding: a first cluster record 206 (e.g., the third record), a second cluster record 208 (e.g., the seventeenth record), a third cluster record 210 (e.g., the twentieth record), and a fourth cluster record 212 (e.g., the fifth cluster), with the fourth field 214 being the portion of the records selected for embedding. In this example, the fingerprint data 204 is divided into four portions of six characters each, and those portions replace the fourth field 214 of the selected records 206, 208, 210, and 212 to generate watermarked dataset 220. Accordingly, the differences between the watermarked dataset 220 and the original dataset 200 may appear to be random or not based on any perceptible pattern, making the watermarking difficult or impossible to detect. Additionally, because only one field (e.g., six characters) of four records of the twenty total records are modified, the watermarking is performed with small modifications to the original dataset 200. To detect that the watermarked dataset 220 is watermarked, clustering may be performed based on the same secret key to generate the same clustering data 202, and the same records and field may be selected based on the same security parameters, such that only the embedded portions of the fingerprint data 204 are identified. The embedded portions may be extracted and combined to generate a copy of the fingerprint data 204, which proves that the watermarked dataset 220 is watermarked, and therefore owned by a data owner who controls the secret key, and the source of the watermarked data in the event of a leak or other privacy breach can be shown by determining the target recipient (or other information) indicated by the fingerprint data 204.

Figure 3:
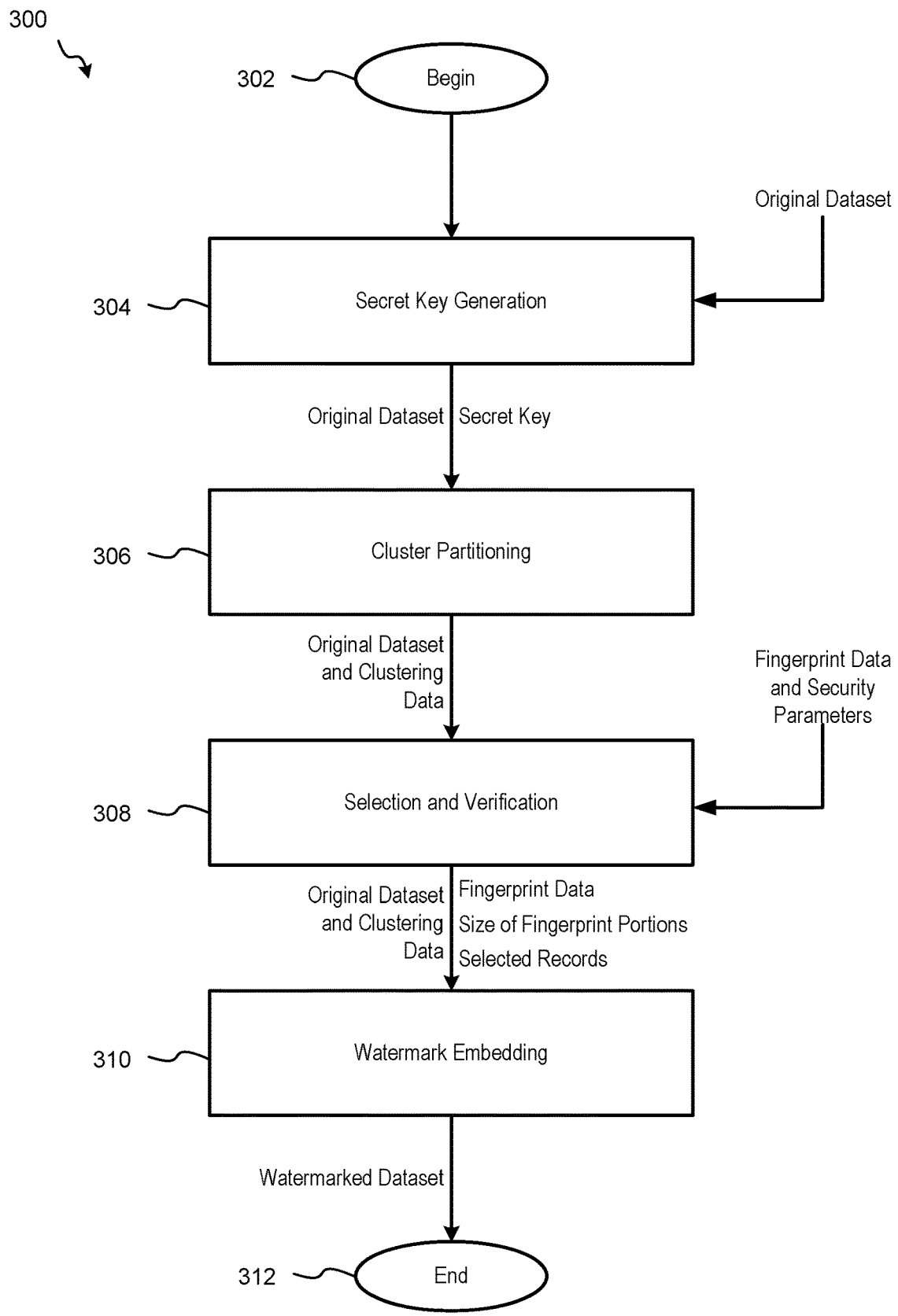
FIG. 3 is a flow diagram illustrating an example of a method for watermarking a dataset according to one or more aspects.

Referring to FIG. 3, a flow diagram of an example of a method for watermarking a dataset according to one or more aspects is shown as a method 300. In some implementations, the operations of the method 300 are stored as instructions that, when executed by one or more processors (e.g., the one or more processors of a computing device or a server), cause the one or more processors to perform the operations of the method 300. In some implementations, the method 300 are performed by a computing device, such as the data security device 102 of FIG. 1 (e.g., a computing device configured to watermark datasets).

The method 300 begins, at 302 and continues to secret key generation, at 304. For example, an original dataset (e.g., a dataset to be watermarked and fingerprinted) is received, and a secret key may be obtained (e.g., generated). In some implementations, one or more de-identification operations have already been performed on the original dataset to de-identify parties or entities which the records of the original dataset represent or correspond to. Although de-identification operations provide some privacy protections in static environments, in more dynamic environments, such protections may be degraded or broken down due to updates to datasets, republishing of datasets by other entities, publication of related or derived datasets, and the like. The secret key includes one or more initial clustering parameters, and optionally other information, which may be added later, to enable performance of the same clustering operations on a dataset at different times. The one or more initial clustering parameters may be user-provided or automatically generated. For example, clustering parameters may be received, such as via user input that indicates initial values for parameters such as a number of clusters, centers/centroids of clusters, a type of clustering algorithm, or the like. Alternatively, the initial clustering parameters may be automatically generated as random or default parameters, or selected from a set of stored parameter sets based on one or more selection criteria, such as a record type of the dataset, a target recipient for sharing the dataset, or the like. In some implementations, the random or default parameters may be overwritten with parameters resulting from one or more iterations of the clustering that optimize one or more criteria or that cause the one or more criteria to satisfy threshold(s). A secret key may be generated to include the initial clustering parameters, regardless of how the parameters are obtained.

The method 300 includes cluster partitioning, at 306. For example, a clustering algorithm, such as k-means clustering (as a non-limiting example), is performed on the dataset to assign records (e.g., attributes) of the dataset to multiple different clusters (e.g., subsets). To illustrate, the dataset and the secret key may be received as inputs, and the initial clustering parameters included in (e.g., indicated by) the secret key may be used to configure one or more iterations of clustering to be performed on the dataset. As a non-limiting example, the clustering algorithm may be k-means, and the initial clustering parameters include initial cluster centers and an initial value of k. Performing the clustering on the dataset partitions the records into multiple different clusters without modifying the dataset itself, such as reordering or otherwise changing the dataset to reflect the assignment of various records to corresponding clusters.

Instead, clustering data that indicates the number of clusters, the assignment of records to the clusters, and/or the like, is output and used during later operations of the method 300.

The method 300 includes selection and verification, at 308. For example, one or more records of each cluster may be selected for embedding fingerprint data (e.g., watermark information). The selection is based on one or more security parameters, such as hash functions, record priorities, record values (e.g., null vs. non-null values), selection schemes (e.g., even/odd selection, selection of every m records, etc.), other security parameters, or a combination thereof. The fingerprint data is an identifier or archive information that identifies the dataset, an intended recipient of the dataset, or another entity or information related to the dataset. For example, the fingerprint data may be text, numerical data, or the like that identifies a target recipient for sharing the dataset, a volume number, a timestamp or date, an identifier of an author of the data, a serial number, other identification or archival information, or the like. In some implementations, a data type of the fingerprint data is compared to a data type of the dataset, and if the types do not match, the fingerprint data is rejected or converted to the data type of the dataset.

As part of selecting the records of each cluster, a number of records (or portions thereof) to be replaced with embedded data and sizes of the portions (e.g., a quantity of embedding and an embedding position for the selected records) are determined based on a size of the fingerprint data, a count of the clusters, and a size of a portion of a record that can be modified without failing one or more of the security parameters, as described above with reference to FIG. 1. Although this is described as being determined during the selection and verification, at 308, in some other implementations, these values may be determined during the cluster partitioning, at 306. In some implementations, if the size of the fingerprint data is larger than the total amount of the records that can be replaced while still satisfying the security parameters, the fingerprint data may be truncated or otherwise condensed to a size that matches the maximum amount of records that can be replaced. Upon determining the quantity of embedding and the embedding position for the records, a quantity of records of each cluster are selected such that the size of the combination of the quantity of embedding for all the selected records is the same as the size of the fingerprint data. In some implementations, the same security parameters are used for all, or at least some, of the clusters. In some other implementations, different security parameters are used for all, or at least some, of the clusters, or application of the security parameters to different clusters results in selection of different records for different clusters. The selected records and the size of the portions of the records (e.g., the embedding size) are output and may be used during the remainder of the watermarking process of the method 300.

The method 300 includes watermark embedding, at 310. For example, portions of the selected records are replaced with corresponding portions of the fingerprint data to embed the fingerprint data in the dataset, thereby watermarking the dataset. For example, for each of the selected records, a portion of the record indicated by the embedded position and having the determined record portion size may be replaced with a corresponding portion of the fingerprint data. The portions of the fingerprint data may be formed by partitioning the fingerprint into a quantity of portions that is equal to the product of the quantity of clusters and the quantity of records selected per cluster (e.g., the cluster count). In this manner, portions of the fingerprint data are embedded and verified cluster-by-cluster independently according to one or more security parameters, and the embedding is performed with minimum modification to the original dataset. Because the clusters are determined based on parameters that are not shared (e.g., that are known only to the entity performing the watermarking) and the records are selected for each cluster based on security parameters that are not shared, the watermarking is difficult or impossible to detect by a recipient of watermarked data, thereby preventing unauthorized removal of the watermarking and improving traceability of the watermarked dataset. After embedding of the watermarking to generate watermarked data, the method 300 finishes, at 312.

Figure 4:
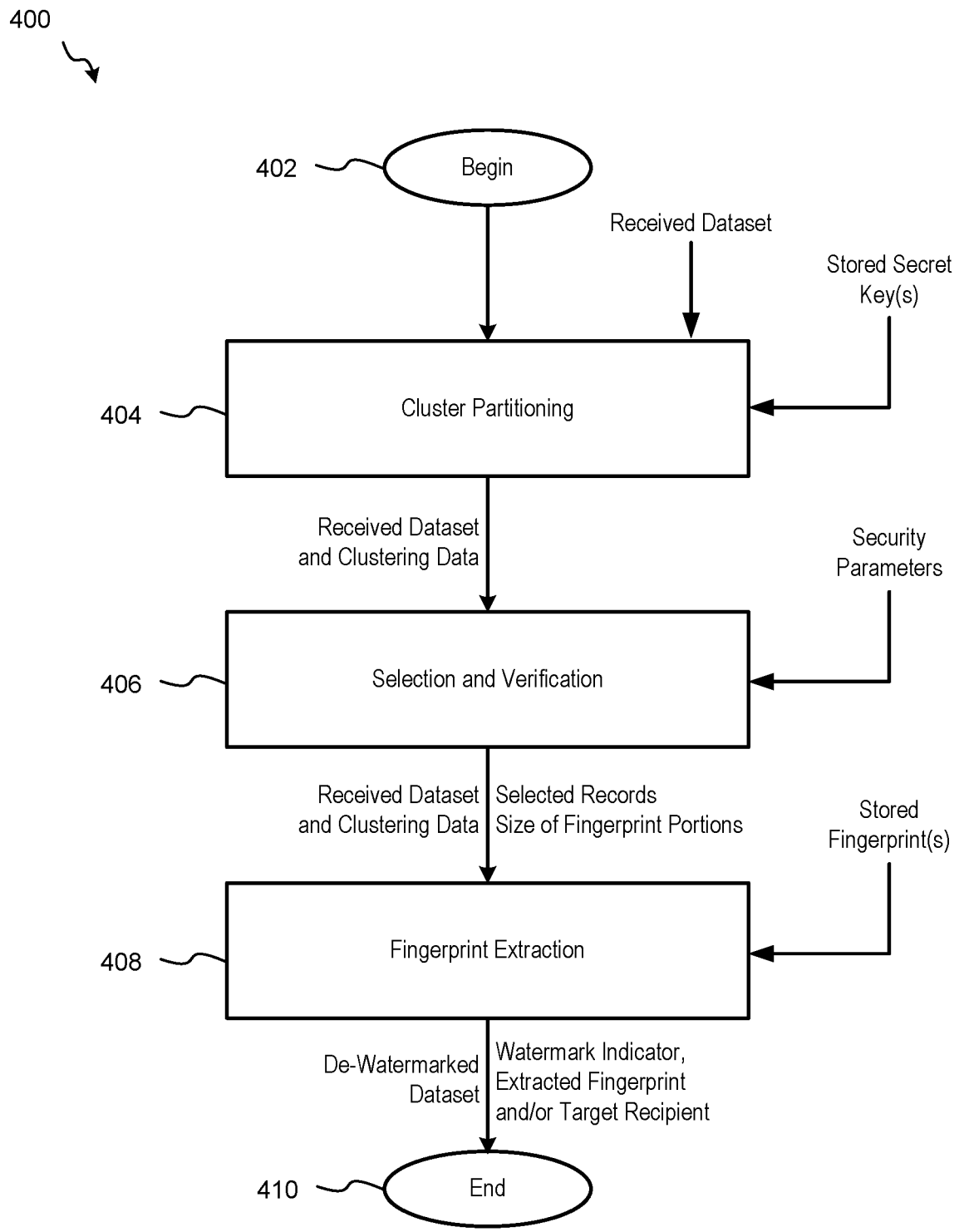
FIG. 4 is a flow diagram illustrating an example of a method for verifying watermarking of a received dataset according to one or more aspects.

Referring to FIG. 4, a flow diagram of an example of a method for verifying watermarking of a received dataset according to one or more aspects is shown as a method 400. In some implementations, the operations of the method 400 are stored as instructions that, when executed by one or more processors (e.g., the one or more processors of a computing device or a server), cause the one or more processors to perform the operations of the method 400. In some implementations, the method 400 are performed by a computing device, such as the data security device 102 of FIG. 1 (e.g., a computing device configured to verify whether received datasets are watermarked and to extract fingerprints from watermarked datasets). To illustrate, a data owner or other entity may receive an alert that a data leak or other data privacy compromising event has occurred, and particularly that one or more datasets that may have originally been owned by the data owner are now having ownership asserted by another party or being shared outside of the control of the data owner, or that one or more similar but not exactly matching datasets have been identified as possible modified datasets based on original datasets owned by the data owner. In order to assert and prove ownership, or to determine whether a modified dataset is based on an original dataset of the data owner, the method 400 may be performed on received datasets to determine whether the datasets are watermarked, and optionally, if the datasets are watermarked, to extract a fingerprint from the watermarked datasets.

The method 400 includes begins, at 402, and continues to cluster partitioning, at 404. For example, a clustering algorithm, such as k-means clustering (as a non-limiting example), is performed on a received dataset to assign records (e.g., attributes) of the dataset to multiple different clusters (e.g., subsets), as described above with reference to FIG. 3. The clustering may be performed based on initial clustering parameters included in (e.g., indicated by) a secret key known to the data owner. In some implementations, the data owner may use a single secret key for watermarking any dataset, and the clustering is performed using this secret key. In some other implementations, the data owner may store or have access to multiple secret keys, and clustering is performed individually for each of the multiple secret keys. Performing the clustering generates clustering data that indicates the number of clusters, the assignment of records to the clusters, and/or the like, and which is output and used during later operations of the method 400.

The method 400 includes selection and verification, at 406. For example, one or more records of each cluster may be selected as possibly containing fingerprint data (e.g., watermark information) based on one or more security parameters, as described above with reference to FIG. 3. The security parameters include or correspond to hash functions, record priorities, record values (e.g., null vs. non-null values), selection schemes (e.g., even/odd selection, selection of every m records, etc.), other security parameters, or a combination thereof. As part of selecting the records of each cluster, a number of records (or portions thereof) that may contain embedded data and sizes of the portions (e.g., a quantity of embedding and an embedding position for the selected records) are determined based on a size stored fingerprints, a count of the clusters, and a size of a portion of a record that can be modified without failing one or more of the security parameters, as described above with reference to FIG. 3. Although this is described as being determined during the selection and verification, at 406, in some other implementations, these values may be determined during the cluster partitioning, at 404. Upon determining the quantity of embedding and the embedding position for the records, a quantity of records of each cluster are selected such that the size of the combination of the quantity of embedding for all the selected records is the same as the size of the each stored fingerprint. In some implementations, the same security parameters are used for all, or at least some, of the clusters. In some other implementations, different security parameters are used for all, or at least some, of the clusters, or application of the security parameters to different clusters results in selection of different records for different clusters. In implementations in which there are multiple stored secret keys, and thus clustering is performed multiple times on the received dataset to generate multiple sets of clustering data, the records of the clusters corresponding to each clustering data set are selected and verified individually to generate multiple sets of selected records. The selected records and the size of the portions of the records (e.g., the embedding size) are output and may be used during the remainder of the watermarking verification process of the method 400.

The method 400 includes fingerprint extraction, at 408. For example, portions of the selected records are extracted and combined to form a candidate fingerprint, and the candidate fingerprint is compared to each of one or more stored fingerprints accessible to the data owner. If the candidate fingerprint matches one of the stored fingerprints, the received dataset is watermarked, and in some implementations a watermark indicator is output that indicates that the received dataset is watermarked. Additionally or alternatively, the particular stored fingerprint that matches the candidate fingerprint may be determined, and information related to the fingerprint may be output, such as a target recipient identified by the fingerprint, a volume number or archive number corresponding to the fingerprint, a timestamp or other information corresponding to the fingerprint, or the like. Additionally or alternatively, the received dataset may be matched to a stored dataset of the data owner (e.g., based on the fingerprint or a comparison to stored datasets), and the extracted portions of the received dataset may be replaced with the corresponding portions of the matching dataset to generate a de-watermarked dataset. After determining whether the extracted fingerprint data matches any of the stored fingerprints, the method 400 finishes, at 410, and the watermark indicator, the information related to the extracted fingerprint, the de-watermarked dataset, or a combination thereof, are output.

Figure 5:
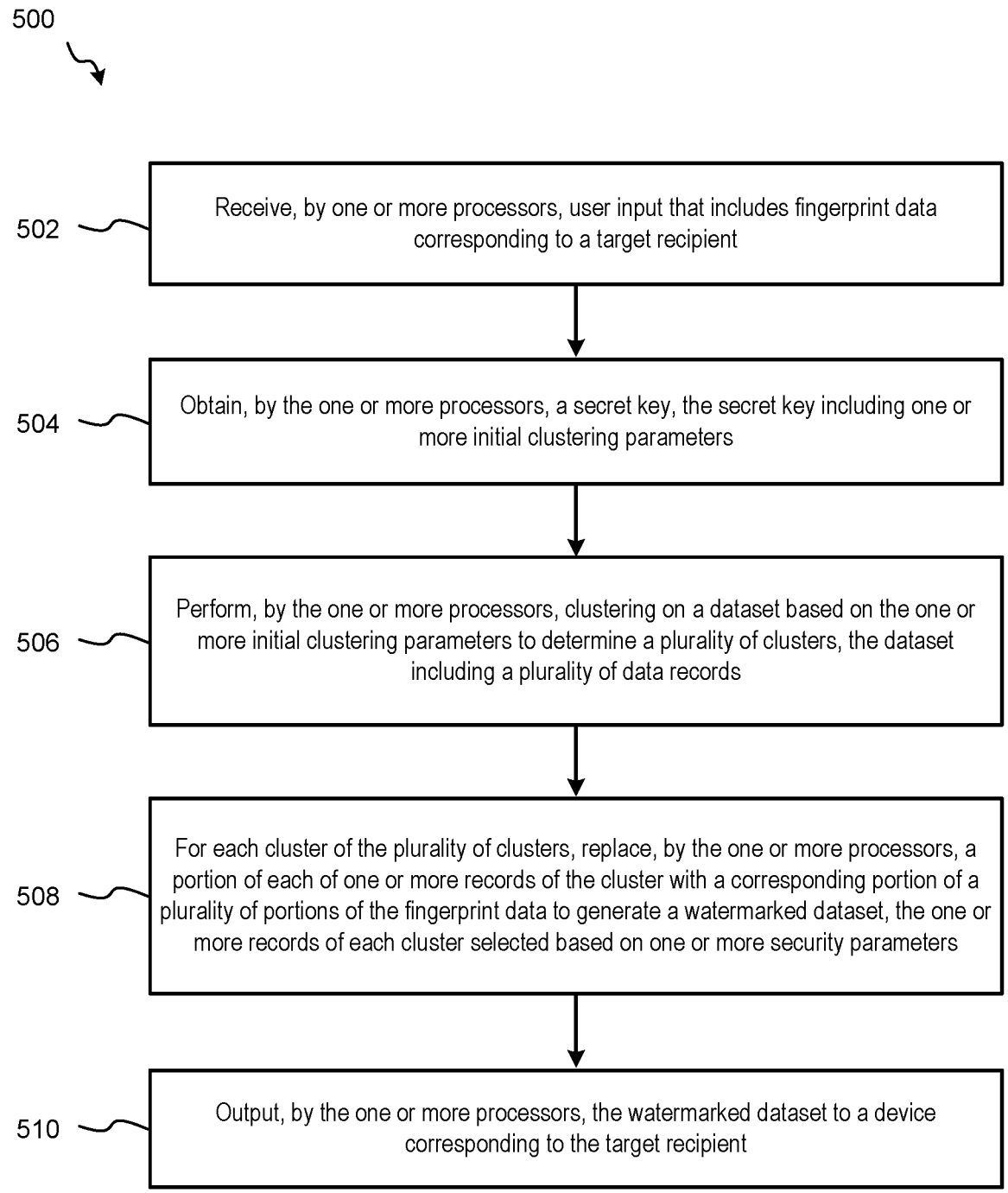
FIG. 5 is a flow diagram illustrating an example of a method for watermarking and fingerprinting datasets for sharing according to one or more aspects.

Referring to FIG. 5, a flow diagram of an example of a method for watermarking and fingerprinting data according to one or more aspects is shown as a method 500. In some implementations, the operations of the method 500 are stored as instructions that, when executed by one or more processors (e.g., the one or more processors of a computing device or a server), cause the one or more processors to perform the operations of the method 500. In some implementations, the method 500 are performed by a computing device, such as the data security device 102 of FIG. 1 (e.g., a computing device configured to watermark and fingerprint structured datasets).

The method 500 includes receiving user input that includes fingerprint data corresponding to a target recipient, at 502. For example, the user input may include or correspond to the user input 180 of FIG. 1, and the fingerprint data may include or correspond to the fingerprint data 182 of FIG. 1. The method 500 includes obtaining a secret key, at 504. The secret key includes one or more initial clustering parameters. For example, the secret key may include or correspond to the secret key 110 of FIG. 1, and the one or more initial clustering parameters may include or correspond to the initial clustering parameters 112 of FIG. 1.

The method 500 includes performing clustering on a dataset based on the one or more initial clustering parameters to determine a plurality of clusters, at 506. The dataset includes a plurality of data records. For example, the dataset may include or correspond to the original dataset 160 of FIG. 1, and the plurality of clusters may be indicated by the clustering data 114 of FIG. 1. In some implementations, the clustering includes k-means clustering. The method 500 includes, for each cluster of the plurality of clusters, replacing a portion of each of one or more records of the cluster with a corresponding portion of a plurality of portions of the fingerprint data to generate a watermarked dataset, at 508. The one or more records of each cluster are selected based on one or more security parameters. For example, the one or more security parameters may include or correspond to the security parameters 120 of FIG. 1, and the watermarked data set includes or corresponds to the watermarked dataset 170 of FIG. 1. The one or more records of each cluster may be selected by the selection engine 134 of FIG. 1. The method 500 includes outputting the watermarked dataset to a device corresponding to the target recipient, at 510. For example, the device corresponding to the target recipient may include or correspond to the target recipient device 152 of FIG. 1.

In some implementations, the user input further includes the one or more initial clustering parameters. For example, the user input 180 of FIG. 1 may include the initial clustering parameters 184 in some implementations. Alternatively, obtaining the secret key may include automatically generating the one or more initial clustering parameters based on optimized parameters determined by performing the clustering or based on random selection. For example, the cluster engine 132 may perform clustering using random or default initial parameters until a criteria satisfies a threshold or is optimized, and the clustering parameters of the last iteration of the clustering may be added to the secret key 110 as the initial clustering parameters 112. In some implementations, the one or more initial clustering parameters include a count of the plurality of clusters, centers of the plurality of clusters, or a combination thereof.

In some implementations, the method 500 also includes determining a count of records in each cluster of the plurality of clusters to undergo replacement based the one or more security parameters, a data record size, and a size of the fingerprint data. For example, the count of records may include or correspond to the record count 118 of FIG. 1. In some such implementations, the method 500 further includes determining a portion size of each of the plurality of portions of the fingerprint data based on the count of records, a count of the plurality of clusters, and the size of the fingerprint data. For example, the portion size of each of the plurality of portions of the fingerprint data may include or correspond to the portion size 116 of FIG. 1.

In some implementations, the method 500 also includes receiving a shared dataset and performing clustering on the shared dataset based on one or more second clustering parameters of a second secret key to determine a second plurality of clusters. For example, the shared dataset may include or correspond to the second dataset 162 of FIG. 1. In such implementations, the method 500 also includes, for each cluster of the second plurality of clusters, comparing a portion of each of one or more records of the cluster to a corresponding portion of a plurality of portions of one or more stored data fingerprints to identify whether the shared dataset is watermarked and outputting a watermark indication based on identification of the shared dataset as being watermarked. The one or more records of each cluster are selected based on one or more second security parameters. For example, the one or more stored data fingerprints may include or correspond to the stored fingerprints 124 of FIG. 1, and the watermark indication may include or correspond to the watermarking indication 174 of FIG. 1. In some such implementations, the method 500 further includes identifying which stored data fingerprint of the one or more stored data fingerprints includes portions that match portions of records of the shared dataset and outputting identification of a second target recipient that corresponds to the stored data fingerprint. For example, the identification of the second target recipient may include or correspond to the recipient ID information 176 of FIG. 1. In some such implementations, the secret key is different from the second secret key. For example, different datasets may be watermarked using different secret keys of the stored secret keys 122 of FIG. 1. Alternatively, the secret key may be the same as the second secret key. For example, multiple datasets may be watermarked using the secret key 110 of FIG. 1. Additionally or alternatively, the one or more security parameters may be different from the one or more second security parameters. For example, watermarking of different datasets may include selecting records of clusters using different security parameters. Alternatively, the one or more security parameters may be the same as the one or more second security parameters. For example, watermarking of multiple datasets may include selecting records of clusters using the security parameters 120 of FIG. 1.

In some implementations, the one or more security parameters include a hash function. Additionally or alternatively, the one or more security parameters include a data value parameter or a priority parameter. Additionally or alternatively, the one or more security parameters include one of even record numbers or odd record numbers. In some implementations, the user input further includes the one or more security parameters. For example, the user input 180 of FIG. 1 may include the security parameters 120, in some implementations.

In some implementations, the method 500 also includes performing clustering on a second dataset based on the one or more initial clustering parameters to determine a second plurality of clusters. For example, the second dataset may include or correspond to the second dataset 162 of FIG. 1. In such implementations, the method 500 also includes, for each cluster of the second plurality of clusters, comparing a portion of each of one or more records of the cluster to a corresponding portion of a plurality of portions of the fingerprint data to identify whether the second dataset is watermarked. The one or more records of each cluster are selected based on the one or more security parameters. For example, the if multiple datasets are watermarked using the same secret key and the same security parameters, the data security device 102 of FIG. 1 may perform watermarking verification on the second dataset 162 using the secret key 110 and the security parameters 120. In such implementations, the method 500 further includes outputting a watermark indication and identification of the target recipient based on identification of the second dataset as being watermarked. For example, the watermark indication may include or correspond to the watermarking indication 174 of FIG. 1, and the identification of the target recipient may include or correspond to the recipient ID information 176 of FIG. 1.

As described above, the method 500 supports watermarking and fingerprinting data to improve traceability of shared data. The watermarking resulting from the method 500 is based on clustering performed using a set of clustering parameters that are not shared with others. Because the initial clustering parameters are not known to other entities, the records (or portions thereof) that are selected for embedding portions of fingerprint data are difficult or impossible to detect by other entities. For example, without advance knowledge of the secret key (e.g., the initial clustering parameters), the clusters are difficult or impossible to reverse-engineer, and thus the records selected for embedding based on the clustering appear random (or pseudorandom). Thus, the watermarking process of the method 500 may prevent detection of the watermarking in shared watermarked datasets by watermarking identification techniques that look for patterns of embedded data. Additionally, because fingerprint data is embedded in the records (or portions thereof) to generate the watermarking, if the watermarked dataset is leaked, modified, or passed off as belonging to another entity, the watermarking may be detected using stored secret keys stored fingerprints. By matching a candidate fingerprint extracted from a received dataset to a stored fingerprint, the party to which watermarked data was originally provided may be identified, thereby identifying a source of a leak or a data breach, or an action in bad faith by the recipient party. Thus, the method 500 provides for improved traceability of datasets using a process of watermarking and fingerprint embedding that is more difficult to detect and reverse engineer than other types of watermarking, which can be useful in identifying parties that have been compromised or that perform improper actions with shared datasets, as well as proving ownership of datasets in question.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

It is noted that other types of devices and functionality may be provided according to aspects of the present disclosure and discussion of specific devices and functionality herein have been provided for purposes of illustration, rather than by way of limitation. It is noted that the operations of the method 300 of FIG. 3, the method 400 of FIG. 4, or the method 500 of FIG. 5 may be performed in any order, or that operations of one method may be performed during performance of another method, such as the method 500 of FIG. 5 including one or more operations of the method 300 of FIG. 3 or the method 400 of FIG. 4. It is also noted that the method 300 of FIG. 3, the method 400 of FIG. 4, and the method 500 of FIG. 5 may also include other functionality or operations consistent with the description of the operations of the system 100 of FIG. 1.

Components, the functional blocks, and the modules described herein with respect to FIGS. 1-5) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for watermarking and fingerprinting datasets for sharing, the method comprising:
   receiving, by one or more processors, user input that includes fingerprint data corresponding to a target recipient;
   obtaining, by the one or more processors, a secret key, wherein the secret key comprises one or more initial clustering parameters;
   performing, by the one or more processors, clustering on a dataset based on the one or more initial clustering parameters to determine a plurality of clusters, the dataset comprising a plurality of data records;
   for each cluster of the plurality of clusters, generating a watermarked dataset by replacing, by the one or more processors, a portion of each of one or more records of the cluster with a corresponding portion of a plurality of portions of the fingerprint data,
      selecting the one or more records of each cluster based on one or more security parameters; and
   outputting, by the one or more processors, the watermarked dataset to a device corresponding to the target recipient.

2. The method of claim 1, wherein the user input further includes the one or more initial clustering parameters.

3. The method of claim 1, wherein obtaining the secret key comprises automatically generating the one or more initial clustering parameters based on optimized parameters determined by performing the clustering or based on random selection.

4. The method of claim 1, further comprising:
   determining, by the one or more processors, a count of records in each cluster of the plurality of clusters to undergo replacement based on the one or more security parameters, a data record size, and a size of the fingerprint data.

5. The method of claim 4, further comprising:
   determining, by the one or more processors, a portion size of each of the plurality of portions of the fingerprint data based on the count of records, a count of the plurality of clusters, and the size of the fingerprint data.

6. The method of claim 1, wherein the one or more initial clustering parameters include a count of the plurality of clusters, centers of the plurality of clusters, or a combination thereof.

7. The method of claim 1, further comprising:
   receiving, by the one or more processors, a shared dataset;
   performing, by the one or more processors, clustering on the shared dataset based on one or more second clustering parameters of a second secret key to determine a second plurality of clusters;
   for each cluster of the second plurality of clusters, comparing, by the one or more processors, a portion of each of one or more records of the cluster to a corresponding portion of a plurality of portions of one or more stored data fingerprints to identify whether the shared dataset is watermarked,
      wherein the one or more records of each cluster are selected based on one or more second security parameters; and
   outputting, by the one or more processors, a watermark indication based on identification of the shared dataset as being watermarked.

8. The method of claim 7, further comprising:
identifying, by the one or more processors, which stored data fingerprint of the one or more stored data fingerprints includes portions that match portions of records of the shared dataset; and
outputting, by the one or more processors, identification of a second target recipient that corresponds to the stored data fingerprint.

9. The method of claim 7, wherein the secret key is different from the second secret key.

10. The method of claim 7, wherein the secret key is the same as the second secret key.

11. The method of claim 7, wherein the one or more security parameters are different from the one or more second security parameters.

12. The method of claim 7, wherein the one or more security parameters are the same as the one or more second security parameters.

13. A system for watermarking and fingerprinting datasets for sharing, the system comprising:
a memory; and
one or more processors communicatively coupled to the memory, the one or more processors configured to:
receive user input that includes fingerprint data corresponding to a target recipient;
obtain a secret key,
wherein the secret key comprises one or more initial clustering parameters;
perform clustering on a dataset based on the one or more initial clustering parameters to determine a plurality of clusters, the dataset comprising a plurality of data records;
for each cluster of the plurality of clusters, generate a watermarked dataset by replacing a portion of each of one or more records of the cluster with a corresponding portion of a plurality of portions of the fingerprint data,
selecting the one or more records of each cluster are-selected based on one or more security parameters; and
output the watermarked dataset to a device corresponding to the target recipient.

14. The system of claim 13, wherein the one or more security parameters include a hash function.

15. The system of claim 13, wherein the one or more security parameters include a data value parameter or a priority parameter.

16. The system of claim 13, wherein the one or more security parameters include one of even record numbers or odd record numbers.

17. The system of claim 13, wherein the user input further includes the one or more security parameters.

18. A non-transitory computer-readable storage medium storing instructions that, when executed by one or more processors, cause the one or more processors to perform operations for watermarking and fingerprinting datasets for sharing, the operations comprising:
receiving user input that includes fingerprint data corresponding to a target recipient;
obtaining a secret key,
wherein the secret key comprises one or more initial clustering parameters;
performing clustering on a dataset based on the one or more initial clustering parameters to determine a plurality of clusters, the dataset comprising a plurality of data records;
for each cluster of the plurality of clusters, generate a watermarked dataset by replacing a portion of each of one or more records of the cluster with a corresponding portion of a plurality of portions the fingerprint data,
wherein the one or more records of each cluster are selected based on one or more security parameters; and
outputting the watermarked dataset to a device corresponding to the target recipient.

19. The non-transitory computer-readable storage medium of claim 18, wherein the clustering comprises k-means clustering.

20. The non-transitory computer-readable storage medium of claim 18, wherein the operations further comprise:
performing clustering on a second dataset based on the one or more initial clustering parameters to determine a second plurality of clusters;
for each cluster of the second plurality of clusters, comparing a portion of each of one or more records of the cluster to a corresponding portion of a plurality of portions of the fingerprint data to identify whether the second dataset is watermarked,
wherein the one or more records of each cluster are selected based on the one or more security parameters; and
outputting a watermark indication and identification of the target recipient based on identification of the second dataset as being watermarked.

* * * * *